United States Patent [19]

Postl

[11] Patent Number: 4,723,297

[45] Date of Patent: Feb. 2, 1988

[54] METHOD FOR AUTOMATIC CORRECTION OF CHARACTER SKEW IN THE ACQUISITION OF A TEXT ORIGINAL IN THE FORM OF DIGITAL SCAN RESULTS

[75] Inventor: Wolfgang Postl, Berg, Fed. Rep. of Germany

[73] Assignee: Siemens Aktiengesellschaft, Berlin and Munich, Fed. Rep. of Germany

[21] Appl. No.: 766,594

[22] Filed: Aug. 19, 1985

[30] Foreign Application Priority Data

Sep. 27, 1984 [DE] Fed. Rep. of Germany ....... 3435525

[51] Int. Cl.[4] .............................................. G06K 9/32
[52] U.S. Cl. ..................................... 382/46; 358/285
[58] Field of Search ................... 382/43, 46; 250/557; 356/400, 138; 358/285; 340/727

[56] References Cited

U.S. PATENT DOCUMENTS 3,831,146  8/1974  Rundle .................................. 382/46
4,338,588  7/1982  Chevillat et al. ..................... 382/46
4,558,461 12/1985  Schlang ................................. 382/46

Primary Examiner—Leo H. Boudreau
Attorney, Agent, or Firm—Hill, Van Santen, Steadman & Simpson

[57] ABSTRACT

A method for automatic skewed position correction in acquisition of a text original in the form of digital scan results to be used for further processing. Before their further processing, the scan results are subjected to a skewed position identification in a first step and are subjected to an electronic rotation in a second step. The angle of the skewed position is identified according to a prescribed optimization method by generating a sequence of systematically selected search angles and directional criteria allocated to these search angles, and employing the angle for the electronic rotation. An interval nesting is preferably employed as the optimization method.

12 Claims, 4 Drawing Figures

METHOD FOR AUTOMATIC CORRECTION OF CHARACTER SKEW IN THE ACQUISITION OF A TEXT ORIGINAL IN THE FORM OF DIGITAL SCAN RESULTS

BACKGROUND OF THE INVENTION

The present invention relates to a method for automatic correction of character skew in the acquisition of a text original in the form of digital scan results or values used for further processing.

In the point-by-point and line-by-line acquisition of text documents with the assistance of an electronic scanner, it is not always guaranteed that the text lines proceed exactly parallel to the scan direction. A skewed position relative to the scan direction (referred to in brief below as "skewed position") can tend to occur when the scanner is designed as an above-table camera or book scanner and the original is freely displaceable on the table or on the support. Positioning with the assistance of marks is imprecise. It is possible with the assistance of stops given single sheet originals, but is hardly possible given book originals or periodicals. Scanners having an automatic drawn-in apparatus—when this is used—can only process single sheet originals.

A skewed position is also present when the original is in fact scanned in edge-parallel manner but is itself the copy of an original that was obliquely scanned.

Although in many instances the reproduction of the scanned original is only deteriorated aesthetically due to a skewed position during scanning, it can be a considerable disruption when the scanning is followed by a structural or semantic analysis of the scan data. For example, typical character recognition methods can only stand a limited skew of the original, among other things because of the problem of isolating text lines. Over and above this, a skewed position deteriorates, complicates, or slows the scanning and raises the cost of every method for the acquisition of horizontal and vertical structures, for example dark strokes in forms, underlining in a machine-written text, or the acquisition of white borders used as criteria for bounding text and image regions. Even slight skewed positions can already have a disturbing effect when, for example, larger illustrations are to be identified as a unit. The method described below solves the cited problems given the precondition that the original has pronounced horizontal and/or vertical structures. This, however, is precisely the case for that class of originals for which a skewed position is undesired.

SUMMARY OF THE INVENTION

An object of the present invention is to create a method for the automatic correction of a skewed position in the acquisition of a text original in the form of digital scan values for the purpose of further processing. This avoids the aforementioned disadvantages given methods of the prior art, and can be executed in a particularly advantageous way with an apparatus which co-operates with a known device comprising at least one visual storage and a picture screen.

According to the method and apparatus of the invention, automatic skewed position correction is provided after acquisition of a text original in a form of digital scan values in that before further processing, the scan results are subjected to a skewed position identification. Thereafter, the scan values are subjected to an electronic rotation.

DESCRIPTION OF THE PREFERRED EMBODIMENTS

The method of the invention assumes a conventional point-by-point and line-by-line acquisition of the original. A suitable scanning means (scanner, camera) scans the scan region in which the original is situated with a resolution of Z lines and S points per line. As a result thereof, it supplies SxZ digital or analog scan results $A(u,v)$ to the acquisition device connected thereto. Here u and v are the coordinates of the scan system, i.e. v denotes the number of the scan line and u denotes the number of a scan point within a line. In this case, u is counted from left to right and v is counted from top to bottom respectively beginning with the number 0, so that $0 \leq u \leq S-1$ and $0 \leq v \leq Z-1$. The sequence in which the scan results are supplied is largely irrelevant for the method, and an intermediate storage may be required. The designations du and dv used below mean the horizontal and vertical distance between adjacent scan points which can differ. For example, given a group three facsimile according to the CCITT standards, $du = \frac{1}{8}$ mm and $dv = 1/7.7$ mm. More recent standardization proposals, however, provide $du = dv$. The illustrations of FIG. 1 and FIG. 2 are also based on this assumption.

Figure 1:
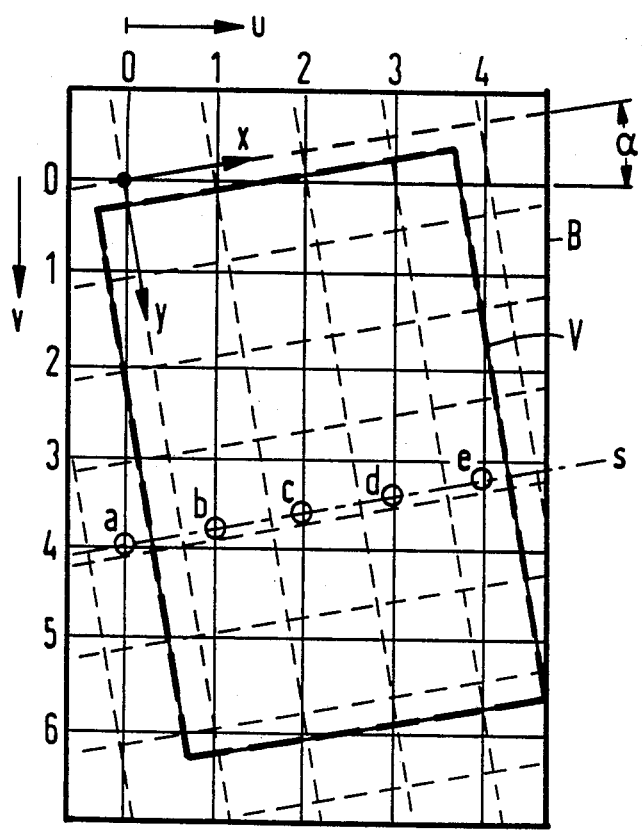
FIG. 1 is a plan view schematically illustrating the original region B with an original V put in place in skewed fashion and acquired by a scanning system (for instance, a camera mounted at a position of the viewer)
Figure 2:
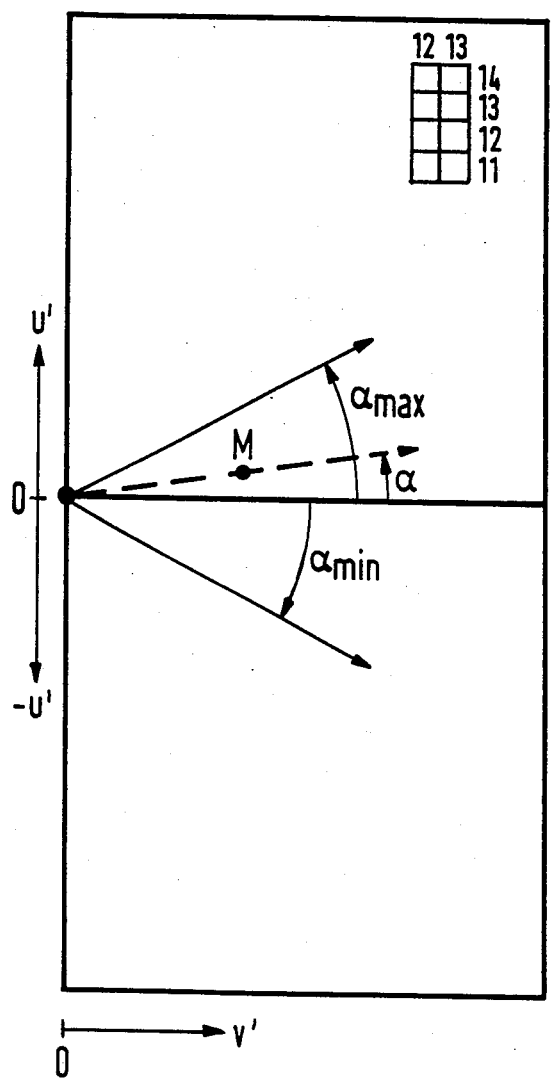
FIG. 2 shows an upper half plan of the region of the Fourier transform of the original mirrored and rotated by 90°.

As already explained, FIG. 1 schematically shows a plan view of the original region B with an original V put in place in skewed fashion and which is acquired by the scanning system (for instance a camera mounted in the position of the viewer). The points of intersection of the indicated matrix for the coordinates u and v correspond to scan points, whereby $Z=7$ and $S=5$. A matrix for rotated coordinates x and y is also shown (in broken lines), the significance thereof being explained below. FIG. 1 is likewise to be viewed as an illustration of a visual storage into which the scan results are read after acquisition, whereby the intersections of the (u,v) matrix correspond to memory cells.

The method is divided into the two steps "identification of skewed position" and "electronic rotation" described below, whereby it is of no significance whether it is applied directly to the scan results output by the scanner or is applied after intermediate storage. A limited intermediate storage, however, is usually also required in the former instance.

Furthermore, insofar as the same scan results must be accessed repeatedly in a method step, a multiple repetition of the scanning is taken into consideration. It is to be taken into consideration that, due to non-reproducible imprecisions of the scanner, different scan events will supply slightly different values for identical points.

Method Step: Identification of Skewed Position

In this step, the angle $\alpha$ of the skewed position is identified by analyzing the scan signal. Two alternative methods are described below.

Method Step: Electronic Rotation

"Rotated" scan results $B(x,y)$ are generated in accordance with the following relationship point-by-point and line-by-line from the scan results $A(u,v)$ supplied by the scanner:

$$B(x,y) = A(u,v)$$

Wherein $$u = x \cos \alpha + y \sin \alpha + u^*$$

$$v = y \cos \alpha - s \sin \alpha + v^*.$$

A positive value of $\alpha$ denotes the counterclockwise direction. The dislocations $u^*$ and $v^*$ can be automatically or manually selected, dependent on $\alpha$ under given conditions, such that the values $B(x,y)$ are deposited in the same memory as the values $A(u,v)$, i.e. the original facsimile is overwritten by the rotated facsimile. Every value sequence $B(0,y), B(1,y), \ldots B(s-1,y)$ represents the scan results of a simulated oblique scanning at the angle $\alpha$. The oblique coordinate network shown with broken lines in FIG. 1 shows such a simulated oblique scanning. The points of intersection correspond to points having whole values of x and y. $u^* = v^* = 0$ was assumed.

The values u and v established by equations (2) and (3) for whole-numbered x and y, however, are generally not whole-numbered. In this case, two alternative techniques are provided:

(a) u and v are rounded to whole-numbers;
(b) $B(x,y)$ is identified by interpolation from the environment of u and v, for example with the assistance of a circuit which realizes the following relationship:

$$B(x,y) = A(u_0,v_0) + [A(u_1,v_0) - A(u_0,v_0)] \times (u - u_0) +$$

$$[A(u_0,v_1) - A(u_0,v_0)] \times (v - v_0) +$$

$$[A(u_1,v_1) - A(u_0,v_0)] \times (u - u_0) \times (v - v_0),$$

whereby $u_1$ and $v_1$ have been generated by rounding u or v up and $u_o$ and $v_o$ have been generated by rounding u or v down to whole values.

If value pairs (u,v) which do not lie in the scan region result, then the respective $B(x,y)$ can be set to a predefined value—for instance the white level.

In case the "rotated" scan results $B(x,y)$ are repeatedly required during the later processing, they are stored after the first rotation. Calculations then need not be repeated.

Arbitrary compression methods are taken into consideration for the storage of original or rotated scan results, particularly run length codes as described in Standardization of Group 3 Facsimile Apparatus for Document Transmission T4, CCITT Yellow Book 1981, pages 222–236, incorporated herein by reference.

For acceleration under given conditions, both method steps can be limited to sub-regions of the original to a subset of the scan results affected. It is particularly relevant to limit the identification of skewed position to those sub-regions wherein it is known that they contain pronounced horizontal or vertical structures, and to exclude regions without such structures. The selection of the subset can also be included therein such that only every $d^{th}$ scan result of every $h^{th}$ line is employed, wherein d and h are any natural numbers whatsoever.

It can also be meaningful to limit the electronic rotation to such regions which fall into a prescribed region of the coordinates (x,y) after the rotation.

Figure 3:
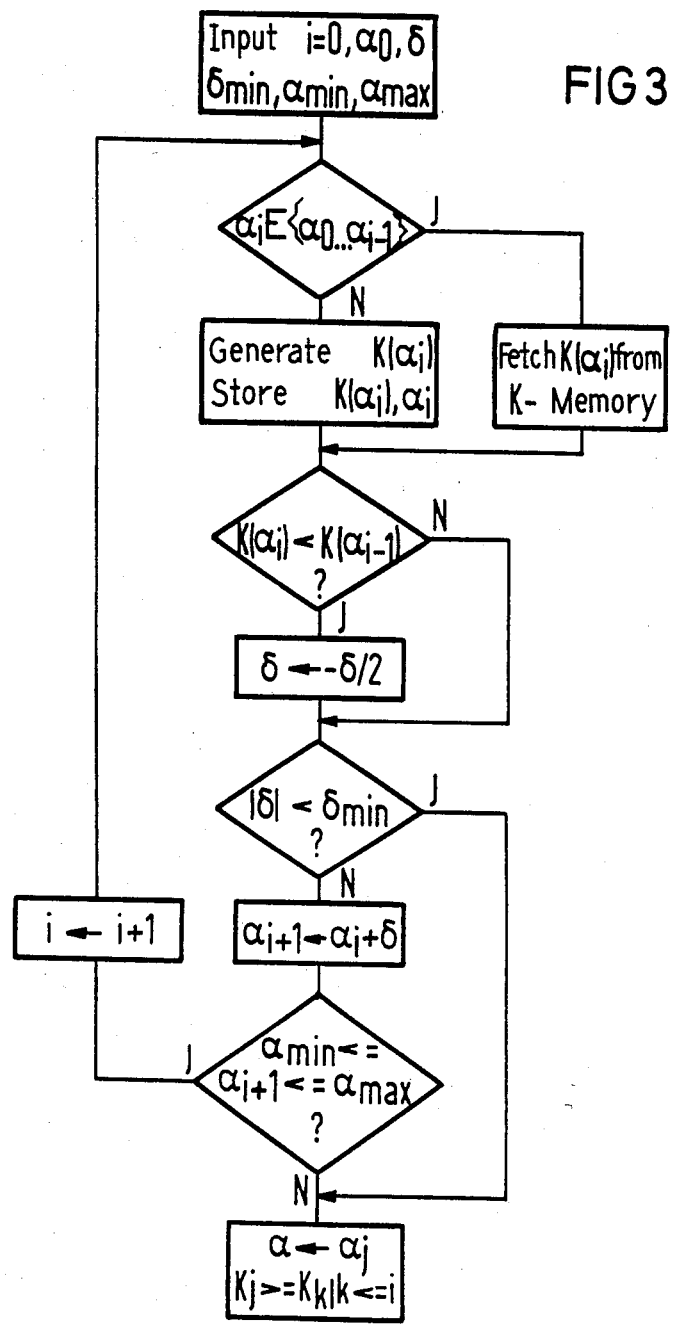
FIG. 3 shows a flow chart of the individual method steps of a defined part of the method of the invention.

The two methods for automatic identification of skewed position which were cited above shall be referred to below as "search scan method" and "search sweep method". In common to both is that directional criteria $K_i$ are generated for a sequence of systematically selected search angles $\alpha_i$ ($i = 0,1, \ldots$), and that by evaluating the directional criteria $K_0 \ldots K_i$ and the corresponding angle, the next scan angle $\alpha_{i+1}$ is generated and the next simulated scan is started with this angle. Before every scan simulation, moreover, an abort criterion is generated which signals whether the search should be concluded. In this case, the hitherto generated search angle $\alpha_i$, which is based on the measure of the directional criterion, is generally used for the electronic rotation. A search method which identifies the best from a plurality of technically realizable circuit parameters—according to a prescribed criterion—is referred to below as "optimization" upon employment of a concept standard in numerical mathematics. A method (interval nesting) which is particularly simple to realize is illustrated by a flow chart in FIG. 3. The abort criterion is formed therein such that either a parameter $\sigma$ modified during the optimization falls below a limit value $\sigma_{min}$, or that the search angle $\alpha_i$ falls below a lower limit value $\alpha_{min}$ or exceeds an upper limit value $\alpha_{max}$. The values of the parameters $\sigma$, $\sigma_{min}$, $\alpha_{min}$, $\alpha_{max}$, as well as of the initial value $\alpha_o$—an estimated value for the skewed position in practice—are to be surrendered at the beginning of the optimization to the device which realizes the search method.

SEARCH SCAN METHOD

An oblique scanning is simulated for every search angle $\alpha_i$, this oblique scanning corresponding to an electronic rotation according to equations (2) and (3) but with the angle $\alpha_i$ instead of $\alpha$.

For every "rotated" line (search line), generally beginning with $y = 0$, the sum of the scan results along this line, that is the value $$S(y) = \sum_x B(x,y)$$

dependent on y or an approximation value of this sum, is generated and stored. Before the storing of the second of these sums and every following sum of these sums, an even, nondecreasing function of the difference between this and the most recently stored sum, preferably its square $$Q(y) = (S(y) - S(y-1))^2$$

is formed and added to the content of a register which had been set to the value 0 before the beginning of the respective search scan. After the end thereof, it contains the desired value of the directional criterion $K_i$.

Compared to the electronic rotation, the search scan can sequence under simplified conditions. The simplification can, for example, be provided such that the rotation is replaced by a clipping in accordance with the replacement of equations (2) and (3) by $$u = x \cos \alpha$$

$$y = y - x \sin \alpha.$$

Given small angles, it is permissible over and above this to replace cos α by 1 and sin α by tan α.

The line referenced s in FIG. 1 represents the track of such a clipping for the simulated scan line y=4. The points a through e correspond to the simulated scan points having the coordinates (0,4) through (4,4).

A method modification for the sum formation corresponding to equation (5) is formed therein such that sequences of black lengths in the form of digital data words are identified for every line with the assistance of a run length detector LD. These data words are then supplied to an adder. In case the acquisition device following the scanner has a run length detector available for any reason whatsoever, for example for generating a run length code according to Standardization of Group 3 Facsimile Apparatus for Document Transmission T4, CCITT Yellow Book 1981, pages 222–236, incorporated herein by reference, this can also be used for the sum formation according to equation (5).

SEARCH SWEEP METHOD

The method itself is composed to two steps, namely of a Fourier transformation and of a search sweep analysis.

FOURIER TRANSFORMATION

By means of a two-dimensional Fourier Transformation, for example upon employment of special processors which are currently commercially available in many modifications and whose functioning is based on a so-called "fast" Fourier transformation, complex Fourier coefficients $A'(u',v')$ are formed from the scan results $A(u,v)$, these being represented by the equation $$A'(u',v') = \sum_{u,v} e^{j2\pi} \longrightarrow (uu'/u + vv'/v)$$

The coefficients of the Fourier power spectrum $$L(u',v') = |A'(u',v')|^2$$

are generated therefrom and deposited in a memory (spectrum memory).

FIG. 2 shows the upper (u',v') half plane rotated by 90° and mirrored. It can also be viewed as a schematic illustration of the spectrum memory. FIG. 2 shows 6 memory cells having the corresponding u' and v' values. Experience has taught that a storage of $L(u',v')$ with a precision of 8 through 16 bits per value suffices.

The numbers U and V in equation (9) are preferably selected identical, i.e., U=V=N, whereby N is a power of 2 which is ≧Z and ≧S. However, U and V can also be smaller when:

(a) the (u,v) region over which the summation is executed is only a sub-region of the original or of the scan region as was pointed out above (it can, for example, be identical with a region which contains pronounced horizontal and/or vertical structures); and (b) when one is prepared to accept an error which is caused by too small a U and V (the effect of this is as though a periodic, additive super-imposition (superimposed copy) of the original were being evaluated instead of the original, whereby the period in the x direction is Uxdu and is Vxdu in the y direction).

As may be clearly seen from FIG. 2, it is generally not necessary to execute the generation and storage of $L(u',v')$ for the entire half plane; on the contrary, the sub-region marked by the indicated sector suffices.

SEARCHSWEEP ANALYSIS

The spectral power density established by the stored coefficients $L(u',v')$ is integrated for every search angle $\alpha_i$ within a search sweep which encloses the angle $\alpha_i$ with the ordinate v'. The respective search sweep is shown in FIG. 2 for the limit angles $\alpha_{min}$ and $\alpha_{max}$ as well as for the (sought) skewed position angle α. Under given conditions, the integration can be limited to one or more sub-regions of the search sweep, for example given text originals having a uniform line spacing, and to the environment of the maximum M shown in FIG. 2 whose distance $r_M$ from the point (0,0) is given by $$r_M = Nxdu/dz$$

wherein dz is the text line spacing. In FIG. 2, $r_M$ has about the value 6. With N=2048, du=(1/200)", and dz=(¼)", $r_M$=41 would apply.

The realization of the integration can be undertaken according to the model of arbitrary mathematical methods, for example by the summation of specimens from the spectrum memory in accordance with the equation $$K = \sum_{u',v'} A(u',v')v' = R(s); u' = v' \sin \alpha$$

Here, R(s) is a sequence of whole numbers in the region of relevant spectral density, roughly the region 35 . . . 45 given the cited example. Similar to the case of the "search scan method", the problem thus results that the values v' sin α are generally not whole numbers. As in that case, this problem can be avoided either by rounding or by interpolation in accordance with the method provided for the electronic rotation.

Figure 4:
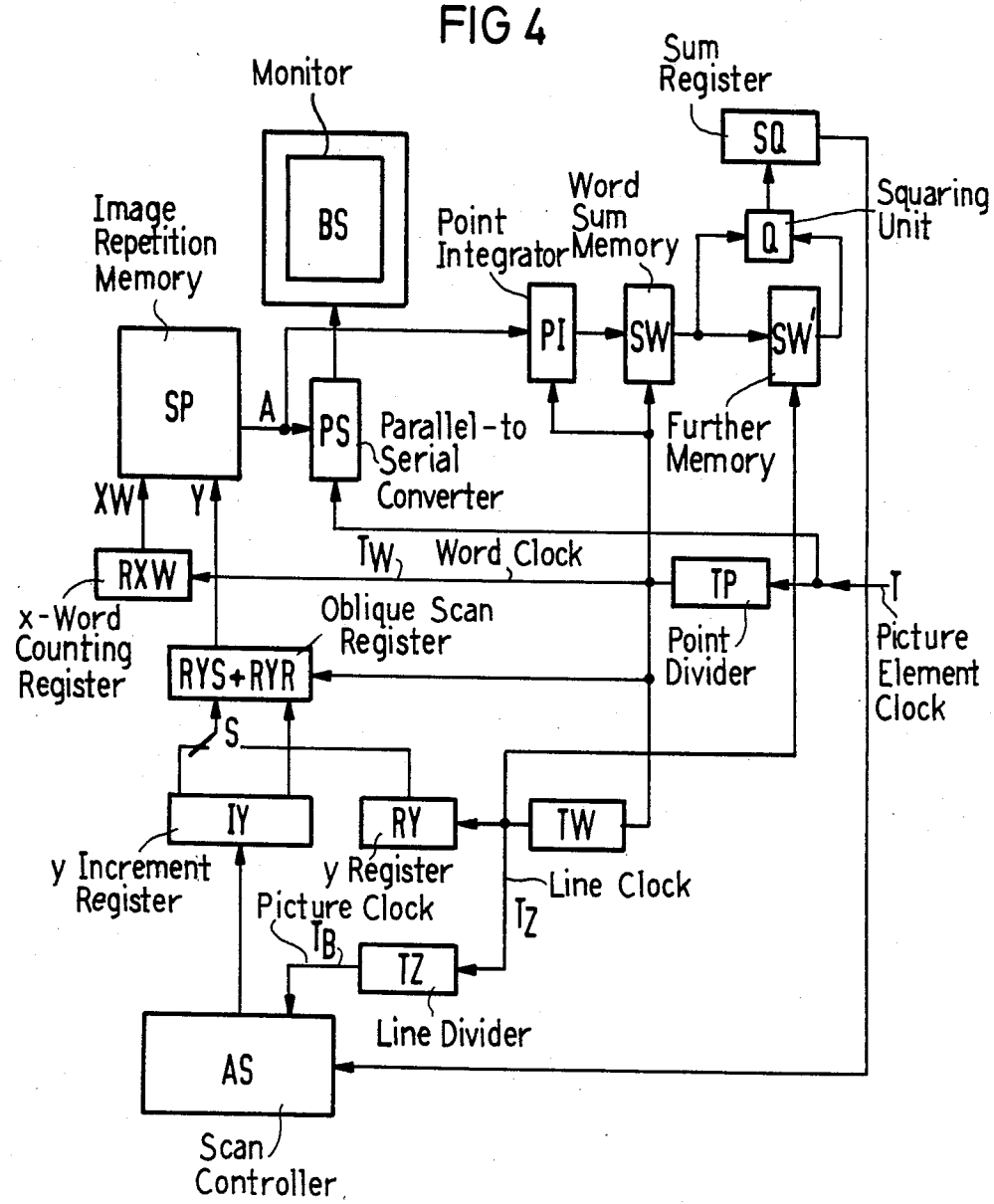
FIG. 4 shows a block diagram of a circuit arrangement according to a preferred exemplary embodiment for an apparatus for the implementation of the method of the invention.

FIG. 4 shows a simple circuit for generating the directional criterion according to the "search scan method" which is combined with a standard circuit for storing and picture screen output of a binary image (1 bit=1 point). For describing this circuit, the time requirement for line flyback and frame flyback is assumed to be 0 for the sake of simplicity. The designations refer to the above description as well as to the flow chart according to FIG. 3.

An image repetition memory SP has two address inputs XW and Y, and an output A. The address of a X-word which contains $n_x$ (for example 16) horizontally successive picture elements is supplied to XW, and the address of a picture line is supplied to Y. From A, the $n_x$ bits of the X-word are transferred in parallel to a parallel-to-serial converter PS and are read out from there to a monitor BS.

Given a picture screen size of 1024×1024 picture elements, for example, the word width of the inputs XW and Y ($n_{xw}$ or $n_y$) is 6 or 10 bits.

The readout from PS is controlled by a picture element clock T. T is divided down to the word clock Tp by a point divider TP in the ratio $n_x$:1. This word clock Tp is supplied to a X-word counting register RXW whose reading is incremented by 1 with every clock pulse. The word clock $T_p$ is also supplied to an oblique scan register (RYS+RYR)—an adder formed of the cascading of the Y status register RYS (the upper $n_y$ places) with the remaining register RYR (the lower $n_y$ places). RYS is conducted to the y-input of SP. With every clock pulse of Tp, the content of a Y increment register IY is added to (RYS+RYR).

In a normal picture output mode, the inputs RYS are connected via a switch S to a Y register RY. Its reading is incremented by 1 with every pulse of the line clock $T_Z$ derived from the word clock Tp by a word divider TW (ratio s:$n_x$ when s is the dot count per line). Given a search scan at the search angle $\alpha_i$, IY is filled with the data word $s_y = n_x * \tan \alpha_i x 2 n_y$ by a scan controller AS before the beginning of the search scan, and RIS is switched as an adder such that the whole-number part of $S_y$ is added to RYR after every search line. The remainder is added to RYR. The scan controller AS also controls the storage of the directional criteria and search angles arising during the optimization. The respectively last directional criterion is supplied to AS from a sum register SQ after one frame pass. The picture clock $T_B$ is derived from the line clock $T_Z$ by a line divider TZ (ratio z:1; z=number of picture lines). The sum register SQ is subsequently erased and (RYS+RYR) as well as RY are reset to the initial value—generally 0. The X-word counting register RXW as well as a word sum memory SW (see below) are reset to their initial reading after every line. The content of SW is previously transmitted into a memory SW' (see below).

The content of SQ is generated as follows.

A point integrator PI forms a sum based on the binary signals present at the output A of the visual storage SP, i.e., forms the mean brightness of these $n_x$ points when 1 denotes "black" and 0 denotes "white" (PI can also be replaced by a fast counter which is connected to the output of PS). This sum is added to the content of the word sum memory SW. A squaring unit Q forms the square of the contents of the two memories SW and SW' and adds it to the content of SQ with the line $T_Z$.

The above-described circuit does not exactly execute the oblique scanning but approximates it in step-shaped fashion with the step width $n_x$. Although this approximation reduces the sharpness of the directional criterion, it allows it to be generated with relatively few and slow, and thus cost-beneficial, logic elements.

Of course, an arbitrary part of the circuit according to FIG. 4 can be realized with the assistance of one or more microprocessors insofar as their speed is adequate. This is particularly true for the circuit part AS.

The storage of the search angles $\alpha_i$ and of the corresponding directional criteria $K_i$ occurs in a particularly simple fashion since RAM memory field SF with p places $SF_o \ldots SF_{p-1}$ is provided, whereby $p >> (\alpha_{max} - \alpha_{min})/\sigma_{min}$, which is filled with a negative value before the beginning of the optimization;

And since $K_i$ is deposited in the memory location $SF_{(\alpha_i - \alpha_{min})/\sigma_{min}}$.

Whether a criterion has already been identified for a specific search angle $\alpha_i$ can then be determined in simple fashion by performing a check to see whether the content of the corresponding memory location is negative.

A modification of the method described above results since the coordinate u is not deposited in the horizontal (i.e., the direction of the scan lines) but in some other preferred direction. The significance of all other coordinates as well as their Fourier transform is then correspondingly modified. Such an assumption is meaningful when it is known that the scanned object comprises pronounced structures in this preferred direction, for example in the direction of the vertical.

When the original comprises pronounced structures both in a horizontal as well as in a vertical direction, then, given an increased time expenditure, the effectiveness of the method can be improved since both are employed as preferred directions in the skewed position identification. This means, for example, that two search scans are respectively executed for one search angle $\alpha_i$, whereby the horizontal is assumed as the preferred direction in the one and the vertical is assumed as the preferred direction in the other. The directional criterion required for the optimization is acquired from a combination, for example from the sum of the two directional criteria thereby identified.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for automatic skewed position correction in acquisition of a text original in a form of digital scan values used for further processing, comprising the steps of:

before the further processing, subjecting the scan values to a skewed position identification and identifying an angle of the skewed position according to a prescribed optimization method by generating a sequence of systematically selected search angles $\alpha_i$ and directional criteria $K_i$ allocated to these search angles, and employing the identified angle for an electronic rotation of the scan values;

allocating the generation of the directional criterion $K_i$ to a search angle $\alpha_i$ such that a line-by-line search scan is simulated for every search angle $\alpha_i$ in a direction which describes the search angle with a preferred direction and corresponds to a rotation by this search angle;

generating and storing at least an approximate value of a sum of scan values along the respective search line for each of the search lines thereby scanned;

before the respective storage of a succeeding one of these sums and every following sum of these sums, storing and adding an even, non-decreasing function of a squared difference between the succeeding one sum and the most recently stored sum to a content of a register which was set to a value 0 before a beginning of the search scan;

using a content of the register after conclusion of the search scan as a desired value of the directional criterion K; and generating the sum by identifying sequences of black lengths in a form of digital data words for every search line with assistance of a run length detector, and supplying these data words to an adder.

2. A method according to claim 1 including the step of employing an interval nesting as an optimization method.

3. A method according to claim 1 including the steps of allocating the generation of the directional criterion $K_i$ to a search angle $\alpha_i$ such that a line-by-line search scan is simulated for every search angle $\alpha_i$ in a direction which describes the search angle with a preferred direction and corresponds to a shearing based on this search angle; generating and storing at least an approximate value of a sum of the scan values along the respective search line for each of the search lines thereby scanned; before respective storage of a succeeding one of these sums and every following sum of these sums, storing and adding an even, non-decreasing function of a squared difference between the one succeeding sum and the most recently stored sum to a content of a register which was set to a value 0 before a beginning of the search scan; and using a content of the register after conclusion of the search scan as a desired value of the directional criterion $K_j$.

4. A method according to claim 1 including the steps of providing the identification of the directional criterion $K_i$ allocated to a search angle $\alpha_i$ by determining coefficients of the scan values, forming complex Fourier coefficients therefrom, generating coefficients of a Fourier power spectrum from the complex Fourier coefficients, and integrating the coefficients of the Fourier power spectrum for every search angle $\alpha_i$ within a search sweep which encloses the angle $\alpha_i$, the search sweep being defined by limit angles $\alpha_{min}$ and $\alpha_{max}$.

5. A method according to claim 4 including the step of limiting the step of integrating to one or more sub-regions of the search sweep.

6. A method according to claim 4 including the step of acquiring the coefficients of the Fourier power spectrum before determination of a first search angle by identifying the Fourier coefficients by a two-dimensional, fast Fourier transformation, and storing squares of the coefficients.

7. A method according to claim 1 including the step of identifying scan values to be summed by interpolation.

8. A method according to claim 1 including the step of replacing scan values to be summed by values which are based on rounded coordinates.

9. A method according to claim 1 including the step of employing horizontal as a preferred direction for analysis.

10. A method according to claim 1 including the step of employing vertical as a preferred direction for analysis.

11. A method according to claim 1 including the step of employing both horizontal as well as vertical as a preferred direction for analysis, whereby the directional criterion allocated to a specific search angle is acquired from a combination of the directional criteria identified for the respective, preferred directions.

12. An apparatus, comprising:
  an image repetition memory connected for readout with a picture element clock and having a first and a second address input and a parallel-to-serial converter connected to an output;
  a monitor connected to an output of the parallel-to-serial converter;
  the output of the image repetition memory also connecting to a point integrator means for forming a sum based on binary signals which are present at an input thereof, this sum being output to an input of a word sum memory;
  a point divider means connected to the picture element clock for deriving a word clock which is connected to an X-word counting register;
  an output of the X-word counting register being connected to a first address input of the picture repetition memory;
  the word clock also being connected to an oblique scan register means designed as an adder, and in a normal picture output mode, a significant part of a content of the scan register means being connected via a change-over S to a Y-register for reading thereof;
  the Y-register being incremented with a line clock output from a connected word divider connected to the word clock;
  means for incrementing during a search scan a content of the oblique scan register means by the content of a Y-increment register with every clock pulse output by the point divider means;
  an input of said Y-increment register being connected to an output of a scan controller to whose first input a picture clock derived by a line divider from the line clock is supplied and whose second input is connected to an output of a sum register whose input is connected to a squaring unit means;
  said squaring unit means forming a square of a difference of contents of the word sum memory and of a further memory and adds it to a content of the sum register with the line clock;
  means for transferring after every picture line or square formation a content of the word sum memory into the further memory;
  means for subsequently resetting the X-word counting register as well as the word sum memory to a prescribed initial reading; and
  means for erasing the sum register after a picture pass.

* * * * *